(12) United States Patent
Stratulate et al.

(10) Patent No.: US 11,473,712 B2
(45) Date of Patent: Oct. 18, 2022

(54) PLUG RETENTION SYSTEM AND METHOD

(71) Applicant: GARTECH, LLC, Houston, TX (US)

(72) Inventors: Gary Warren Stratulate, Houston, TX (US); Gary Pendleton, Shotley Bridge (GB)

(73) Assignee: GARTECH, LLC, HOuston, TX (US)

( * ) Notice: Subject to any disclaimer, the term of this patent is extended or adjusted under 35 U.S.C. 154(b) by 0 days.

(21) Appl. No.: 17/063,503

(22) Filed: Oct. 5, 2020

(65) Prior Publication Data
US 2021/0102654 A1 Apr. 8, 2021

Related U.S. Application Data

(60) Provisional application No. 62/911,589, filed on Oct. 7, 2019.

(51) Int. Cl.
*F16L 55/11* (2006.01)
*E21B 33/12* (2006.01)

(52) U.S. Cl.
CPC ............. *F16L 55/11* (2013.01); *E21B 33/12* (2013.01)

(58) Field of Classification Search
CPC ........... F16L 55/11; F21B 33/12; F04B 53/10; F04B 53/16; F04B 39/14; F16K 27/08
USPC ........ 138/89; 137/15.17; 454.4; 285/91, 391
See application file for complete search history.

(56) References Cited

U.S. PATENT DOCUMENTS

| | | | | |
|---|---|---|---|---|
| 3,203,460 A * | 8/1965 | Kuhne | .................. | E21B 17/043 411/263 |
| 3,857,414 A * | 12/1974 | Richardson | ........... | F16L 55/136 138/90 |
| 4,760,868 A * | 8/1988 | Saxon | .................... | F16L 55/136 138/89 |
| 4,982,763 A * | 1/1991 | Klahn | ...................... | F28F 11/02 138/89 |
| 6,170,530 B1 * | 1/2001 | Steblina | ................ | F16L 55/132 138/89 |
| 8,365,754 B2 * | 2/2013 | Riley | ....................... | F04B 53/22 137/15.17 |
| 9,909,580 B2 * | 3/2018 | Jahnke | ..................... | F04B 53/16 |
| 10,830,233 B2 * | 11/2020 | Jahnke | ..................... | F04B 53/16 |
| 2017/0089334 A1 * | 3/2017 | Jahnke | .................. | E21B 43/126 |
| 2019/0345931 A1 * | 11/2019 | Jahnke | .................... | F04B 53/16 |

* cited by examiner

*Primary Examiner* — Patrick F Brinson
(74) *Attorney, Agent, or Firm* — Ewing & Jones, PLLC

(57) ABSTRACT

An apparatus for retaining a plug in a fluid end used in hydrocarbon recovery having a lock collar configured in a cylinder shape, a screw, a center hexagon configured to be inserted into the lock collar, the center hexagon configured with a port that extends along a longitudinal axis of the center hexagon, the center hexagon further configured with six sides, each of the six sides interfacing with the port, and the center hexagon further configured with a bottom face and a segmental wedge.

19 Claims, 6 Drawing Sheets

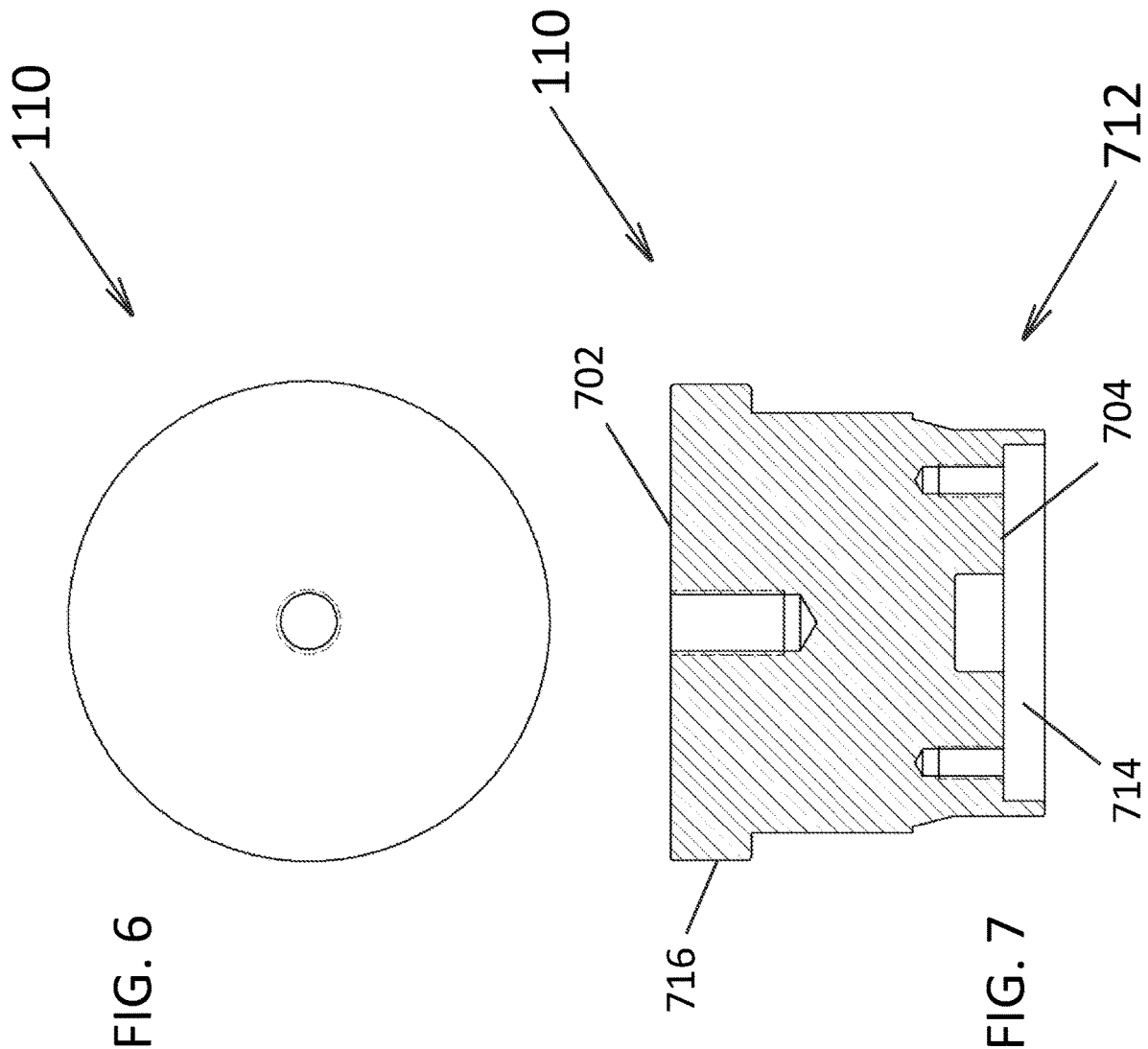

PLUG RETENTION SYSTEM AND METHOD

CROSS REFERENCE TO RELATED APPLICATIONS

The current application claims priority to U.S. Provisional Patent Application 62/911,589 filed Oct. 7, 2019, the entirety of which is incorporated by reference.

STATEMENT REGARDING FEDERALLY SPONSORED RESEARCH OR DEVELOPMENT

None.

FIELD OF THE DISCLOSURE

Aspects of the disclosure relate to pump systems. More specifically, aspects of the disclosure relate to plug retention devices for fluid ends for pump devices.

BACKGROUND INFORMATION

Pump systems are used to convey fluids from a starting point to an ending point Conventional pump systems generally have a suction side and a discharge side, as well as a means for creating a vacuum so that fluid is transferred from the starting point to the ending point. Engines or motors may be used to provide the motive force for the fluid. At the suction or discharge side, a "fluid end" is provided to deliver the fluid either to or from the pump system.

Fluid ends, generally, experience the highest forces within the overall fluid transfer system. At the discharge end, for example, pumps may deliver fluid at a rating of over 15,000 pounds per square inch. At this high pressure, the bodies of a fluid end are exposed to large pressure stresses, therefore, the bodies are generally made of high quality metallic blocks of material. To prevent leaks from occurring, high quality gaskets are placed within the bodies.

Placement of gaskets and retention of plugs installed in these fluid ends are an important maintenance task that has economic implications. In the case of pumps used in oil and gas operations that pump drilling fluids within a fluid system, a very high reliability is expected. When mud pumps are not used, thorough maintenance is performed such that reliability is maintained at high levels to allow for continued operation. Failure of a pump system reduces the overall cooling capability of a drilling rig, as well as minimizing cutting removal.

In conventional fluid end units, maintaining the interior components, such as gaskets, and providing inspection services is problematic. Due to the high stresses that fluid end units experience, connections on the fluid end units are made with a large number of bolts that must be untorqued. Fluid end units have a central plug that may be removed after untorquing, thereby allowing access to the inner spaces and equipment of the fluid end. Central plugs have a hole arrangement that accepts a crow bar or elongated pipe. Generally, for either torqueing or untorqueing, a hammer is used to impact the crow bar or elongated pipe. Continual blows by the hammer seat or unseat the central plug.

Setting or unsetting a central plug in a fluid end unit by, impact of a hammer significantly impacts safety of workers as well as times for processing. Such fluid end units may be located at elevation, and hammer impact setting may cause a worker to fall or be exposed to serious injury. Additionally, setting or unsetting a central plug may also over torque or under torque the central plug. Field personnel merely hammer until the central plug becomes loose or becomes snug. Such activities have several problems, First, hammering the central plug can be dangerous from a safety standpoint. Second, the central plug, or components of the fluid end may become damaged due to the hammer blows. Fluid ends can be "off the shelf" items, but in the case of some components, the fluid end may be a specialty design. Damage to the fluid end may be costly from the standpoint of fixing the degraded components. Unavailability of the fluid end may be just as costly, as even if the degraded components are available to be replaced, field activities must stop until repairs are completed.

There is a need to provide an apparatus to more accurately tighten or loosen arrangements that are currently operated by manual closure methods.

There is a further need to provide an apparatus to close fluid end units that are safer for workers than conventional apparatus.

There is a further need to provide a method to close fluid end units that is safer for workers than conventional closure methods.

There is a still further need to provide an apparatus that is economical to manufacture to decrease the cost of service related to fluid ends.

There is also a need to provide an apparatus that does not need specialized training in order for maintenance to be performed.

SUMMARY

So that the manner in which the above recited features of the present disclosure can be understood in detail, a more particular description of the disclosure, briefly summarized below, may be had by reference to embodiments, some of which are illustrated in the drawings. It is to be noted that the drawings illustrate only typical embodiments of this disclosure, and are therefore not to be considered limiting of its scope, for the disclosure may admit to other equally effective embodiments without specific recitation. Accordingly, the following summary provides just a few aspects of the description and should not be used to limit the described embodiments to a single concept.

In another non-limiting embodiment, an apparatus is disclosed. The apparatus may comprise a lock collar configured in a round shape, a screw, a center hexagon configured to be inserted into the lock collar, the center hexagon configured with a port that extends along a longitudinal axis of the center hexagon, the center hexagon further configured with six sides, each of the six sides interfacing with the port and the center hexagon further configured with a bottom face, a segmental wedge configured to interface with the lock collar and the center hexagon, wherein the segmental wedge is configured with a flanged area to interface with the lock ring; and a plug configured to be inserted into a fluid end.

In one non-limiting embodiment, a method is disclosed. The method may comprise placing a plug within a fluid end of a pump and inserting a first portion of a segmented wedge within the lock collar arrangement. The method may also comprise inserting a second portion of the segmented wedge within the lock collar arrangement and inserting a center hexagon within a void created by the first portion and the second portion joined within the lock collar. The method may further comprise installing at least two bolts through the lock collar into the fluid end; and inserting a central screw into a port within the center hexagon, such that insertion of the central screw contacts the plug applying a force on to the plug.

In another non-limiting embodiment, an arrangement is disclosed. The arrangement may comprise a lock collar configured in a cylinder shape, the lock collar having an open volume with a first diameter, a second diameter, and a third diameter, wherein the second diameter is greater than both the first diameter and the third diameter. The arrangement may also comprise a segmental wedge configured to fit within the open volume such that the flanged area of the segmented wedge interfaces with the second diameter of the lock collar. The arrangement may also comprise a plug configured to be inserted into a fluid end.

Other aspects and advantages will become apparent from the following description and the attached claims.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the drawings. It is to be noted, however, that the appended drawings illustrate only typical embodiments of this disclosure and are therefore not to be considered limiting of its scope, for the disclosure may admit to other equally effective embodiments.

FIG. 6 is a top view of a plug of the plug retention arrangement of FIG. 1.

FIG. 7 is a side view of the plug of FIG. 6.

Figure 1:
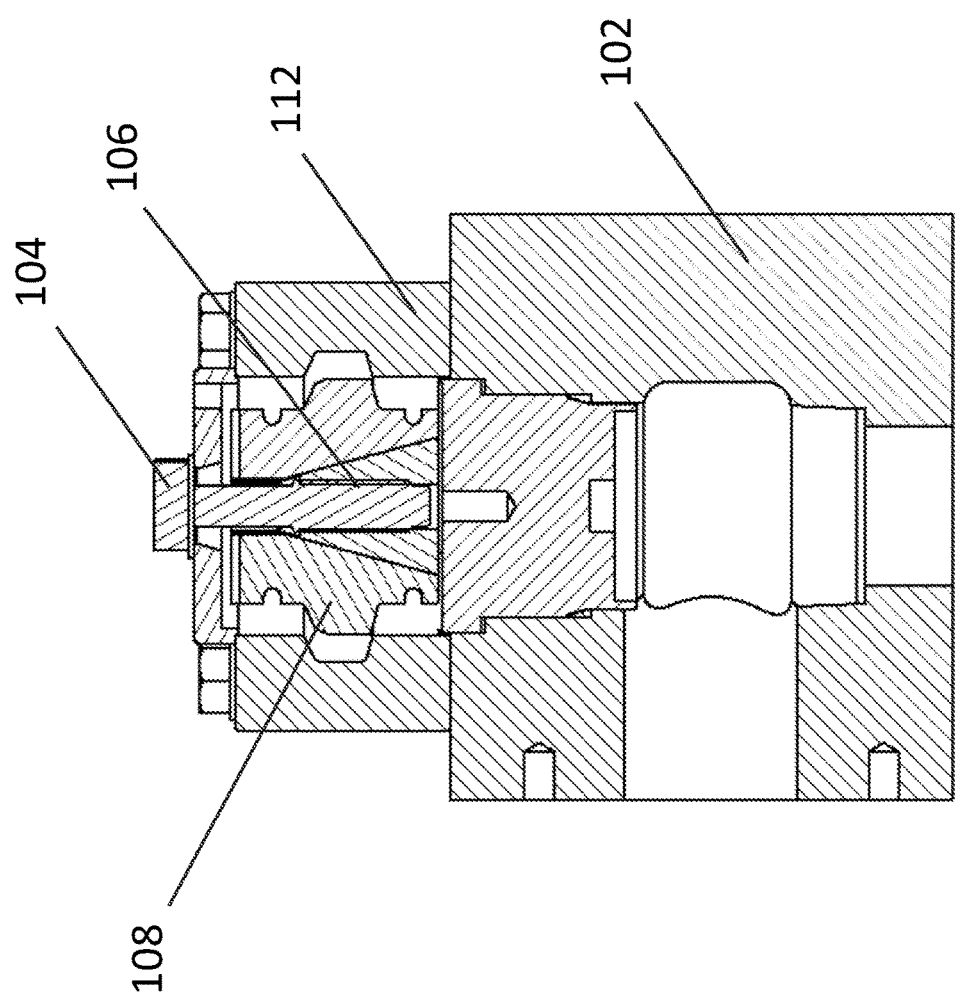
FIG. 1 is a side elevation view of a plug retention arrangement in accordance with one example embodiment of the disclosure.

To facilitate understanding, identical reference numerals have been used, where possible, to designate identical elements that are common to the figures ("FIGS"). It is contemplated that elements disclosed in one embodiment may be beneficially utilized on other embodiments without specific recitation.

DETAILED DESCRIPTION

In the following, reference is made to embodiments of the disclosure. It should be understood, however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the claims except where explicitly recited in a claim. Likewise, reference to "the disclosure" shall not be construed as a generalization of inventive subject matter disclosed herein and shall not be considered to be an element or limitation of the claims except where explicitly recited in a claim.

In the following, reference is made to embodiments of the disclosure. It should be understood, however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the claims except where explicitly recited in a claim. Likewise, reference to "the disclosure" shall not, be construed as a generalization of inventive subject matter disclosed herein and shall not be considered to be an element or limitation of the claims except where explicitly recited in a claim.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first", "second" and other numerical terms, when used herein, do not imply a sequence or order unless clearly indicated by the context. Thus, a first element, component, region, layer or section discussed herein could be termed a second element, component, region, layer or section without departing from the teachings of the example embodiments.

When an element or layer is referred to as being "on," "engaged to," "connected to," or "coupled to" another element or layer, it may be directly on, engaged to, connected to, coupled to the other element or layer, or interleaving elements or layers may be present. In contrast, when an element is referred to as being "directly on," "directly engaged to," "directly connected to," or "directly coupled to" another element or layer, there may be no interleaving elements or layers present. Other words used to describe the relationship between elements should be interpreted in a like fashion. As used herein, the term "and/or" includes any and all combinations of one or more of the associated listed terms.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art, that some embodiments may be practiced without many of these details, and that numerous variations or modifications from the described embodiments are possible. As used herein, the terms "above" and "below", "up" and "down", "upper" and "lower", "upwardly" and "downwardly", and other like terms indicating relative positions above or below a given point are used in this description to more clearly describe certain embodiments.

Aspects of the disclosure relate to a plug retention system. Plugs are often used in fluid ends of pump systems to allow for access to different sections of the pumps in maintenance periods. Often, these pumps are "high head" pump systems that may be used in oil and gas exploration to allow different fluids to be pumped to accomplish a function. As exploration of oil and gas can be safety significant for individuals and, the environment, assuring the capability of components to perform their function is vital to operations that use such equipment.

Aspects of the current disclosure provide for a single individual to perform maintenance functions on a fluid end. Conventional apparatus does not have such a capability as numerous individuals are needed to install and maintain the heavy apparatus. Aspects of the current disclosure allow a single person using simple tools the ability to install or remove a plug within a system, as well as replace components such as failed or degraded gaskets within the fluid end.

Aspects of the disclosure also allow for even torque to be placed upon the plug when installed within the fluid end. This even torque allows for more effective installation of the component and less potential future failures as pinching and overtorquing of the gasket is eliminated. As the aspects of the disclosure are equally applicable to large fluid end systems and small fluid end systems, different sizes of the aspects of the disclosure may be used to enable installers to allow for proper maintenance to be conducted.

Other advantages of the disclosure provide for field personnel to conduct the maintenance activities without the need for specialized training. The simple design of the apparatus and methods for installation allow workers with basic tool skills to achieve results that were only previously achieved by previously highly trained individuals in conventional apparatus.

Referring to FIG. 1, a cross-sectional view of a plug retention system 100 is illustrated. The plug retention system 100 is configured to interface with a fluid end 102 for a pump system. The pump system may be any type of pump. A plug 110 is configured to be inserted into the fluid end 102. A gasket may be inserted prior to placement of the plug 110 within the fluid end 102. A center hexagon 106 is configured to be placed over a center of the plug 110. A lock collar 112, with twelve equidistant holes surround a segmental wedge 108 and the center hexagon 106.

In the illustrated embodiment, a screw 104 may be tightened into the center hexagon 106. The center hexagon 106 is configured to bear upon the segmental wedge 108, which contacts the lock collar 112. The lock collar 112 is configured such that placement of a connecting threaded bolt will connect the lock collar 112 to the fluid end 102, thus keeping the lock collar 112 in place during tightening of the screw 104 and subsequent axial force created on to the fluid end 102 by the screw 104 on to the plug 110.

Figure 2:
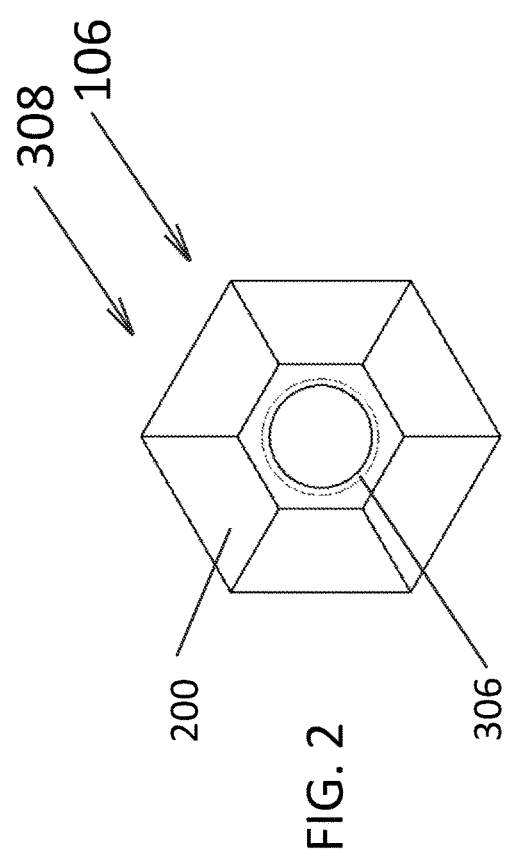
FIG. 2 is a top view of a center hexagon of the plug retention arrangement of FIG. 1.
Figure 3:
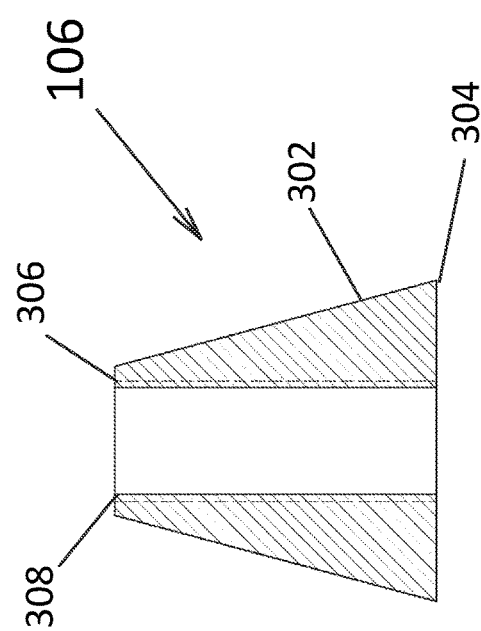
FIG. 3 is a side view of the center hexagon of FIG. 2.

Referring to FIGS. 2 and 3, the center hexagon 106 is illustrated. The center hexagon 106 has a port 200 that continues through a length of the center hexagon 106. A thread 306 is created within the center hexagon 106 from the port 200 through the entire length of the hexagon 106. The center hexagon 106 is configured with sloped sides 302. The bottom 304 of the center hexagon 106 is larger than the top 308.

Figure 4:
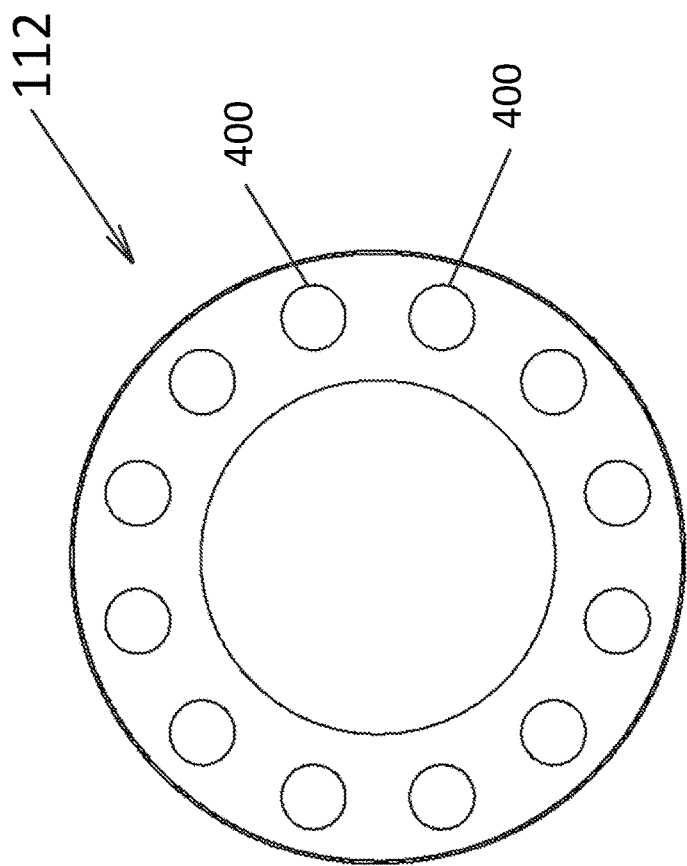
FIG. 4 is top view of the lock collar of FIG. 1.
Figure 5:
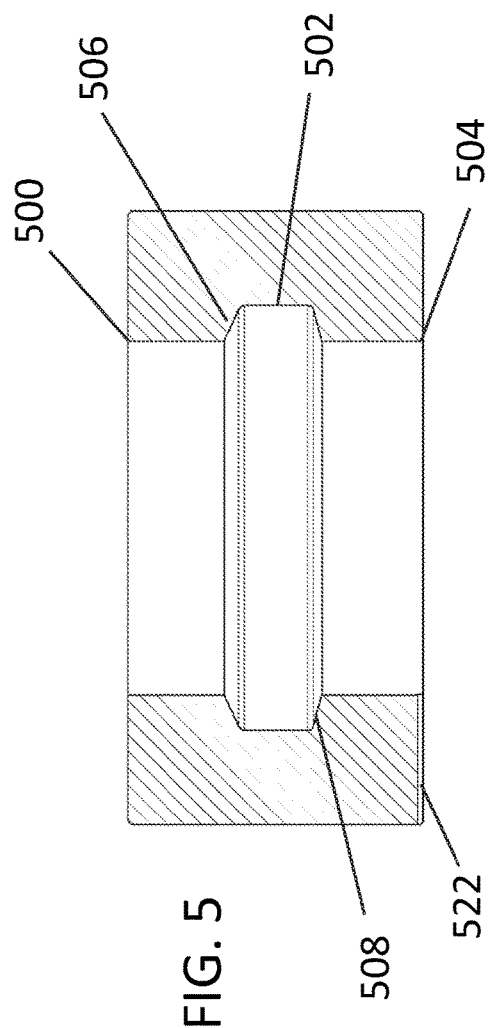
FIG. 5 is a side view of the lock collar of FIG. 4.

Referring to FIGS. 4 and 5, a top view of a lock collar 112 is illustrated. Holes 400 are placed in the lock collar 112, such that the holes 400 are equidistant around a center point of the lock collar 112. The lock collar 112 is configured with a first diameter 500, a second diameter 502 and a third diameter 504. The second diameter 502 is configured around a center or midpoint between a top exterior face 520 and a bottom exterior face 522. In the illustrated embodiment, the second diameter 502 is configured with a larger open diameter than the first diameter 500 and the third diameter 504. A first camphor 506 extends between the first diameter 500 and the second diameter 502. A second, camphor 508 extends between the second diameter 502 and the third diameter 504. The holes 400 are configured, in the illustrated embodiment to be through holes extending through the length of the lock collar.

Referring to FIGS. 6 and 7, a plug 110 is illustrated. The plug 110 may be retained within the fluid end body, as described in FIG. 1. The plug 110 has a top face 702 and a bottom face 704. The top face 702 is provided with a pair of top face holes 706. These top face holes 706 may be threaded to accept a threaded bolt, screw or other connection member. The bottom face 704 is configured with bottom holes 710. In the illustrated embodiment, there are two bottom holes 710. The bottom holes 710, similar to the top holes 706, may be threaded to accept a threaded bolt, screw or other connection member.

The bottom face 704 is sunken from a bottom edge 712 that extends from the bottom face 704. A countersunk area 714 is also provided in the bottom face 704. A flanged area 716 is provided extending down from the top face 702. The flanged area 716 is configured to provide a bearing surface for the plug 110 when installed in a fluid end.

Figure 8:
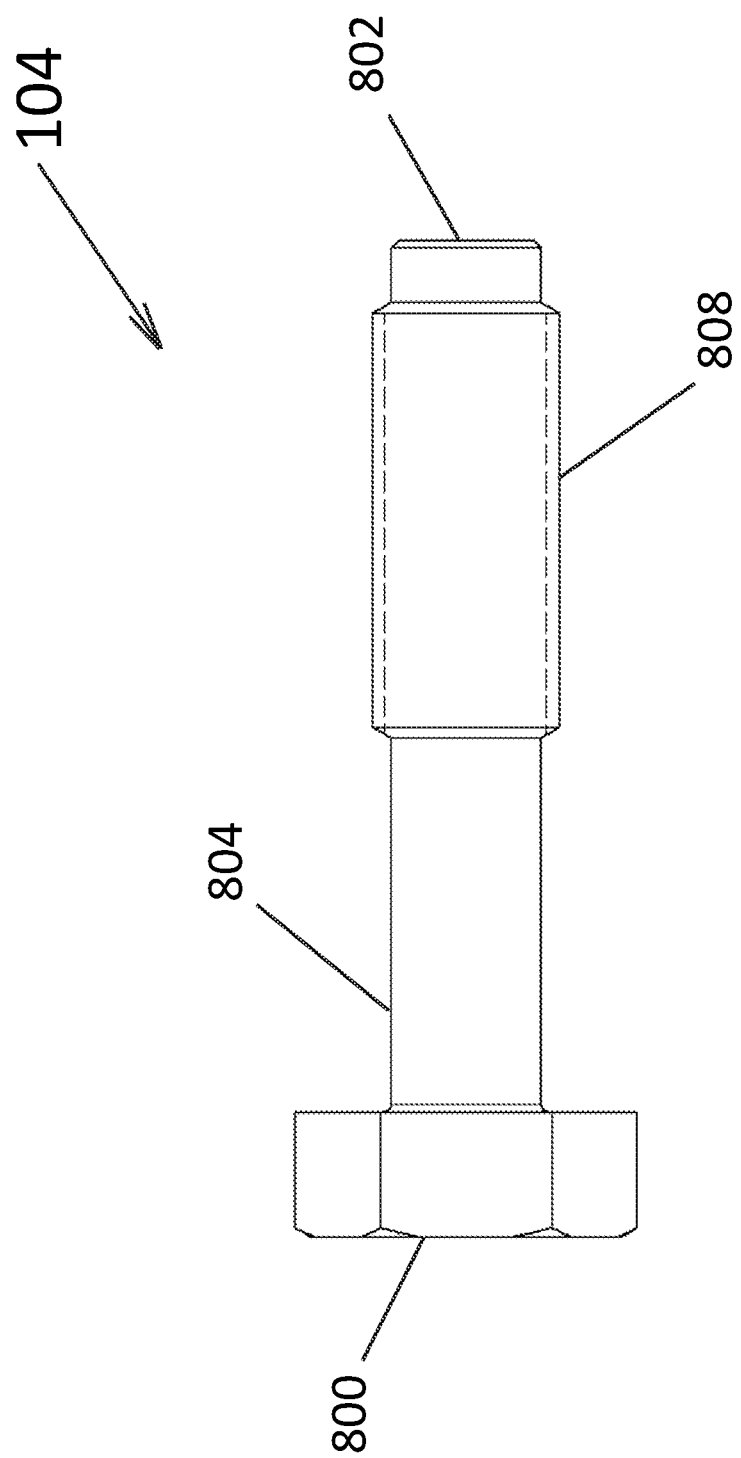
FIG. 8 is a side view of a bolt of the plug retention arrangement of FIG. 1.

Referring to FIG. 8, a center screw 104 is illustrated. The center screw 104 is configured with a head 800. The head 800 is a standard hex head arrangement that will allow for tightening and loosening of the center screw 104 when installed. The head 800 of the center screw 104 is connected to a first diameter section 804. Progressing from the head 800 past the first diameter 804, a threading section 808 is positioned before the end 802. In one example embodiment, the center screw 104 is approximately 8 inches long (20.32 cm). Other configurations are possible.

The embodiments disclosed provide a method for establishing a force on a plug 110 for a fluid end 102 for a pump. In the embodiments illustrated, an axial force is placed upon the plug 110 by a screw 104 that is tightened by a user. An interface is provided with the screw 104 through a center hexagon 106. A transfer of force is created between the center hexagon 106 and a segmented wedge 108. The segmented wedge 108 may be a two or more piece segmented device that accepts force transfer from the center hexagon 106 through a flanged area to a lock collar 112. The lock collar 112 is configured in a single unit that is connected to the fluid end 102 by through bolts (not, shown).

Figure 9:
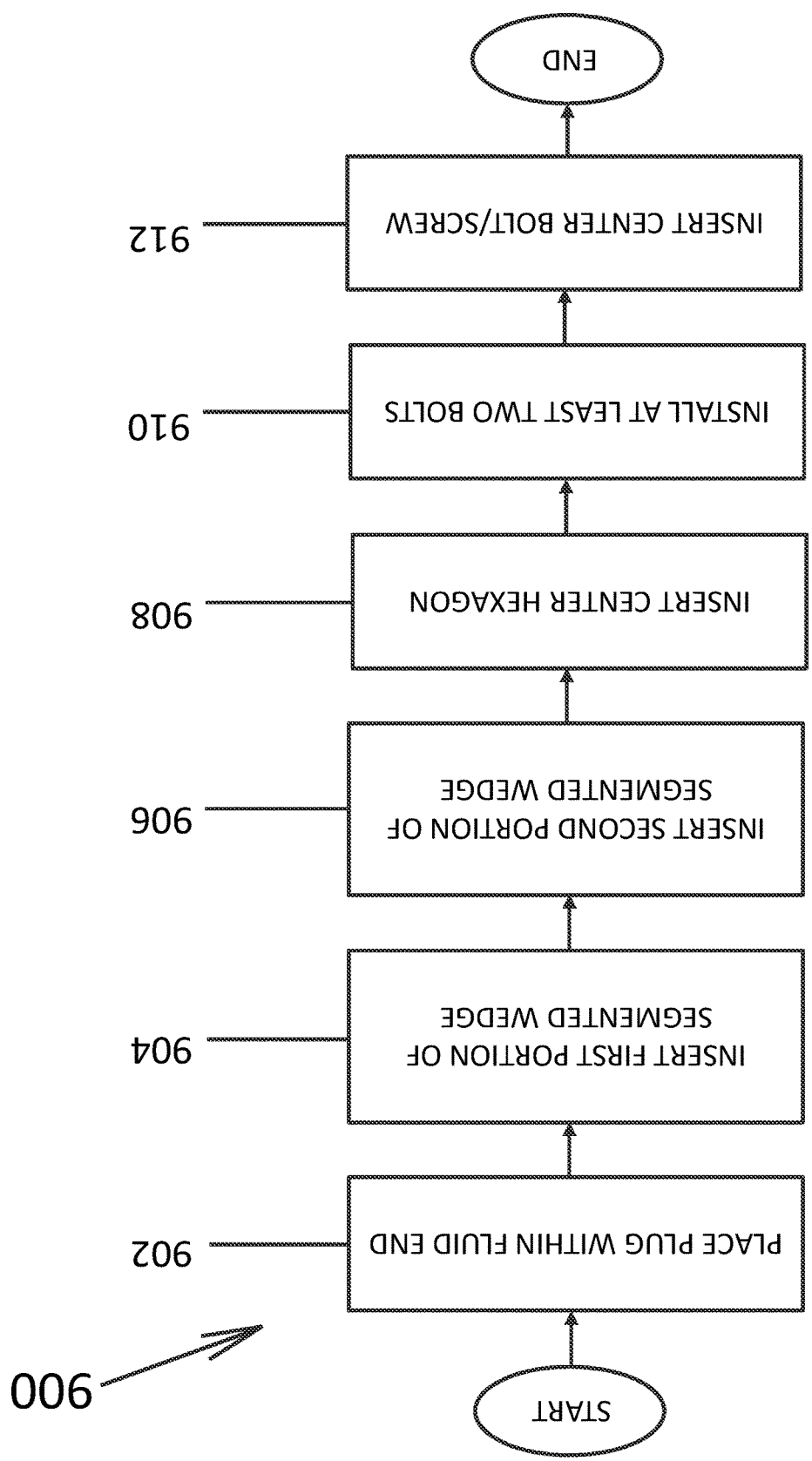
FIG. 9 is flow chart for the method for assembling and using a plug retention apparatus in accordance with a described embodiment.

Referring to FIG. 9, a method 900 of use of a plug retention system is also disclosed. The method 900 first comprises, at 902 placing a plug within a fluid end of a pump. At 904, the method proceeds with inserting a first portion of a segmented wedge within the lock collar arrangement. At 906, the method continues with inserting a second portion of the segmented wedge within the lock collar arrangement. At 908 the method further proceeds with inserting a center hexagon within a void created by the first portion and the second portion joined within the lock collar. At 910, the method further proceeds with installing at least two bolts through the lock collar into the fluid end. At 912, the method proceeds with inserting a central screw into a port within the center hexagon, such that insertion of the central screw contacts the plug, applying a force on to the plug.

In the above described embodiments, an apparatus is provided to more accurately tighten or loosen arrangements that are currently operated by manual closure methods.

In the above described embodiments, an apparatus is provided to close fluid end units that are safer for workers than conventional apparatus.

In the above described embodiments, a method is provided to close fluid end units that is safer for workers than conventional closure methods.

In the above described embodiments, an apparatus is provided that is economical to manufacture to decrease the cost of service related to fluid ends.

The apparatus described above also does not need specialized training in order for maintenance to be performed on fluid ends.

In one embodiment, an apparatus is disclosed. The apparatus may comprise a lock collar configured in a round shape, a screw and a center hexagon configured to be inserted into the lock collar, the center hexagon configured with a port that extends along a longitudinal axis of the center hexagon, the center hexagon further configured with six sides, each of the six sides interfacing with the port and the center hexagon further configured with a bottom face. The apparatus may also comprise a segmental wedge configured to interface with the lock collar and the center hexagon wherein the segmental wedge is configured with a flanged area to interface with the lock ring; and a plug configured to be inserted into a fluid end.

In another embodiment, the apparatus may be configured wherein the lock collar is configured with at least two threaded holes.

In another embodiment, the apparatus may be configured wherein the at least two threaded holes is twelve threaded holes.

In another embodiment, the apparatus may be configured wherein the center hexagon is configured with an internal thread to interface with the screw.

In another embodiment, the apparatus may be configured wherein the lock collar is configured with a center section opening with a first diameter, a second diameter and a third diameter.

In another non-limiting embodiment, the apparatus may be configured wherein the second diameter is larger than the first diameter and the third diameter.

In another non-limiting embodiment, the apparatus may be configured wherein the flanged area of the segmental wedge interfaces with the second diameter of the lock collar.

In another non-limiting embodiment, the apparatus may be configured wherein the plug is configured with a top face and a bottom face.

In another non-limiting embodiment, the apparatus may be configured wherein the top face is configured with two top holes.

In another non-limiting embodiment, the apparatus may be configured wherein the top holes are threaded.

In another non-limiting embodiment, the apparatus may be configured wherein the bottom face of the plug is configured with two bottom holes.

In another non-limiting embodiment, the apparatus may be configured wherein the plug has at least one flanged surface.

In another non-limiting embodiment, the apparatus may be configured wherein a bottom face of the plug has a countersunk area.

In another non-limiting embodiment, the apparatus may be configured wherein the lock collar is configured with a first diameter opening located adjacent to a first face, a third diameter opening located adjacent to a second face and a second diameter opening located between the first diameter opening and the third diameter opening, and wherein a first camphor edge is positioned between the first diameter and the second diameter, and a second camphor edge is configured between the second diameter opening and the third diameter opening.

In another non-limiting embodiment, the apparatus may be configured wherein the screw is configured with a head.

In another non-limiting embodiment, the apparatus may be configured wherein the screw is further configured with a thread on at least one portion of a diameter of the screw.

In another non-limiting embodiment, the apparatus may be configured wherein the screw is further configured with a second portion with a second diameter, and wherein the second portion does not have a thread.

In another non-limiting embodiment, a method may be performed comprising placing a plug within a fluid end of a pump, inserting a first portion of a segmented wedge within the lock collar arrangement, inserting a second portion of the segmented wedge within the lock collar arrangement, inserting a center hexagon within a void created by the first portion and the second portion joined within the lock collar, installing at least two bolts through the lock collar into the fluid end, and inserting a central screw into a port within the center hexagon, such that insertion of the central screw contacts the plug applying a force on to the plug.

In another non-limiting embodiment an arrangement is disclosed. The arrangement may comprise a lock collar configured in a cylinder shape, the lock collar having an open volume with a first diameter, a second diameter, and a third diameter, wherein the second diameter is greater than both the first diameter and the third diameter. The arrangement may also comprise a segmental wedge configured to fit within the open volume such that the flanged area of the segmented wedge interfaces with the second diameter of the lock collar. The arrangement may also comprise a plug configured to be inserted into a fluid end.

While embodiments have been described herein, those skilled in the art, having benefit of this disclosure, will appreciate that other embodiments are envisioned that do not depart from the inventive scope. Accordingly, the scope of the present claims or any subsequent claims shall not be unduly limited by the description of the embodiments described herein.

What is claimed is:

1. An apparatus, comprising:
    a lock collar configured in a round shape;
    a screw;
    a center hexagon configured to be inserted into the lock collar, the center hexagon configured with a port that extends along a longitudinal axis of the center hexagon, the center hexagon further configured with six sides, each of the six sides interfacing with the port and the center hexagon further configured with a bottom face and wherein the center hexagon is configured to accept the screw;
    a segmental wedge configured to interface with the lock collar and the center hexagon, wherein the segmental wedge is configured with a flanged area to interface with a lock ring; and
    a plug configured to be inserted into a fluid end, wherein the lock collar is configured to be attached to the fluid end through at least one threaded bolt.

2. The apparatus according to claim 1, wherein the lock collar is configured with at least two threaded holes.

3. The apparatus according to claim 2, wherein the at least two threaded holes is twelve threaded holes.

4. The apparatus according to claim 1, wherein the center hexagon is configured with an internal thread to interface with the screw.

5. The apparatus according to claim 1, wherein the lock collar is configured with a center section opening with a first diameter, a second diameter, and a third diameter.

6. The apparatus according to claim 5, wherein the second diameter is larger than the first diameter and the third diameter.

7. The apparatus according to claim 5, wherein the flanged area of the segmental wedge interfaces with the second diameter of the lock collar.

8. The apparatus according to claim 1, wherein the plug is configured with a top face and a bottom face.

9. The apparatus according to claim 8, wherein the top face is configured with at least one top hole.

10. The apparatus according to claim 9, wherein the top hole is threaded.

11. The apparatus according to claim 8, wherein the bottom face of the plug is configured with two bottom holes.

12. The apparatus according to claim 8, wherein the plug has at least one flanged surface.

13. The apparatus according to claim 8, wherein a bottom face of the plug has a countersunk area.

14. The apparatus according to claim 1, wherein the lock collar is configured with a first diameter opening located adjacent to a first face, a third diameter opening located adjacent to a second face, and a second diameter opening located between the first diameter opening and the third diameter opening, and wherein a first camphor edge is positioned between the first diameter and the second diameter, and a second camphor edge is configured between the second diameter opening and the third diameter opening.

15. The apparatus according to claim 1, wherein the screw is configured with a head.

16. The apparatus according to claim 1, wherein the screw is further configured with a thread on at least one portion of a diameter of the screw.

17. The apparatus according to claim 16, wherein the screw is further configured with a second portion with a second diameter and wherein the second portion does not have a thread.

18. A method, comprising:
placing a plug within a fluid end of a pump;
inserting a first portion of a segmented wedge within a lock collar arrangement;
inserting a second portion of the segmented wedge within the lock collar arrangement;
inserting a center hexagon within a void created by the first portion and the second portion joined within the lock collar;
installing at least two bolts through the lock collar into the fluid end; and
inserting a central screw into a port within the center hexagon, such that insertion of the central screw contacts the plug applying a force on to the plug.

19. An arrangement, comprising:
a lock collar configured in a cylinder shape, the lock collar having an open volume with a first diameter, a second diameter and a third diameter, wherein the second diameter is greater than both the first diameter and the third diameter;
a segmental wedge configured to fit within the open volume such that a flanged area of the segmented wedge interfaces with the second diameter of the lock collar; and
a plug configured to be inserted into a fluid end, wherein the lock collar is configured to be attached to the fluid end through at least one threaded bolt.

\* \* \* \* \*